US011829643B2

(12) United States Patent
Teh et al.

(10) Patent No.: US 11,829,643 B2
(45) Date of Patent: Nov. 28, 2023

(54) MEMORY CONTROLLER SYSTEM AND A METHOD OF PRE-SCHEDULING MEMORY TRANSACTION FOR A STORAGE DEVICE

(71) Applicant: SKYECHIP SDN BHD, Pulau Pinang (MY)

(72) Inventors: Chee Hak Teh, Pulau Pinang (MY); Yu Ying Ong, Pulau Pinang (MY); Weng Li Leow, Pulau Pinang (MY); Muhamad Aidil Bin Jazmi, Pulau Pinang (MY)

(73) Assignee: SKYECHIP SDN BHD, Bayan Lepas (MY)

( * ) Notice: Subject to any disclaimer, the term of this patent is extended or adjusted under 35 U.S.C. 154(b) by 102 days.

(21) Appl. No.: 17/562,071

(22) Filed: Dec. 27, 2021

(65) Prior Publication Data

US 2023/0129791 A1    Apr. 27, 2023

(30) Foreign Application Priority Data

Oct. 25, 2021    (MY) ................................ 2021006393

(51) Int. Cl.
*G06F 12/00*    (2006.01)
*G06F 3/06*    (2006.01)

(52) U.S. Cl.
CPC .......... *G06F 3/0659* (2013.01); *G06F 3/0604* (2013.01); *G06F 3/0656* (2013.01); *G06F 3/0673* (2013.01)

(58) Field of Classification Search
CPC .... G06F 3/0659; G06F 3/0604; G06F 3/0656; G06F 3/0673; G06F 3/061
See application file for complete search history.

(56) References Cited

U.S. PATENT DOCUMENTS

| 5,870,625 A  | *  | 2/1999  | Chan ................... G06F 9/3824 |
|  |  |  | 712/E9.046 |
| 11,609,709 B2 | * | 3/2023 | Teh ..................... G06F 3/0673 |
| 2015/0186068 A1 |  | 7/2015 | Benisty et al. |
| 2020/0371956 A1 | * | 11/2020 | Bhoria ................. G06F 3/3001 |
| 2022/0100423 A1 | * | 3/2022 | Teh ..................... G06F 3/0673 |

FOREIGN PATENT DOCUMENTS

CN    110262753 A    9/2019

\* cited by examiner

*Primary Examiner* — John A Lane
(74) *Attorney, Agent, or Firm* — ASLAN LAW, P.C.

(57) ABSTRACT

A memory controller system (and method of pre-scheduling memory transaction) for a storage device comprising a linked-list controller; a plurality of command buffers to store read commands or write commands, and an arbiter to issue command. Each command buffer containing variables set by the linked-list controller. The linked-list controller is configured to execute commands in sequence independent of logical command buffer sequence. The command buffer is configured to support read commands with maximum number of write commands. The linked-list controller is configured to merge multiple write commands that are going to the same address and snarfs read commands from write commands if both commands are going to the same address and the read commands that are snarfed are loaded into a separate command buffer. The variables contained in each of the command buffer indicates status and dependency of the command buffer to create a link forming a command sequence.

15 Claims, 8 Drawing Sheets

| C80 | P_HOL : 0 |
| Not loaded | P_TOL : 0 |
| Dep : NA | B_HOL : 0 |
| | B_TOL : 0 |

| C81 | P_HOL : 0 |
| Not loaded | P_TOL : 0 |
| Dep : NA | B_HOL : 0 |
| | B_TOL : 0 |

| C82 | P_HOL : 0 |
| Not loaded | P_TOL : 0 |
| Dep : NA | B_HOL : 0 |
| | B_TOL : 0 |

| C83 | P_HOL : 0 |
| Not loaded | P_TOL : 0 |
| Dep : NA | B_HOL : 0 |
| | B_TOL : 0 |

| C84 | P_HOL : 0 |
| Not loaded | P_TOL : 0 |
| Dep : NA | B_HOL : 0 |
| | B_TOL : 0 |

Figure 2A

MEMORY CONTROLLER SYSTEM AND A METHOD OF PRE-SCHEDULING MEMORY TRANSACTION FOR A STORAGE DEVICE

CROSS-REFERENCE TO RELATED APPLICATIONS

This application claims priority to MY Patent Application No. P12021006393 filed on Oct. 25, 2021, the entire contents of which are hereby incorporated by reference.

TECHNICAL FIELD

This invention relates generally to a memory management of a storage device. More particularly, the present invention relates to a memory controller system and a method of pre-scheduling memory transaction for a storage device.

BACKGROUND ART

In modern uniprocessor and multi-processor systems, multiple memory transactions may be sent to the memory system concurrently. In case the memory system is not immediately available to service a memory transaction, or if a memory transaction is deferred to allow a later transaction to proceed ahead of it, the latency of the later transaction will decrease at the expense of the increased latency of the prior memory transaction. However, if the transaction or DRAM command reordering algorithm results in a more efficient utilization of the memory system, then the average memory-access latency for all memory transactions will decrease.

US2015186068A1 discloses a method, apparatus, and system for queuing storage commands. A command buffer may store storage commands for multiple command queues. Linked list controllers may control linked lists, where each one of the linked lists identifies the storage commands that are in a corresponding one of the command queues. The linked list storage memory may store next command pointers for the storage commands. A linked list element in any of the linked lists may include one of the storage commands stored in the command buffer and a corresponding one of the next command pointers stored in the linked list storage memory.

CN110262753A discloses a method, a system and an SSD for accelerating command response, and relates to the technical field of SSD data processing. The method of accelerating command response includes establishing several task linked lists of the same priority and corresponding to different command types; analyzing the command types stored in the queue in the memory buffer; based on the command type, finding the task linked list corresponding to the command, and Link the command to the end of the corresponding task chain; poll the task chain to obtain the executable commands under the task chain; process the command to obtain the command. The present invention has the advantage of speeding up the response speed of the command.

The aforementioned references may strive to provide memory controller system to improve memory scheduling performance. Nevertheless, they have a number of limitations and shortcomings. For instance, the memory controllers in the aforementioned references have fixed assignments of read or write command queues that arbitrate for DRAM bandwidth via an age-based scheduling policy. Furthermore, the aforementioned references comprise independent read and write command queues that handles reads and writes independently without the ability to convert memory cycles.

Accordingly, there remains a need to have a memory controller system which overcomes the aforesaid problems and shortcomings.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to allow commands to be executed in sequence independent of logical command buffer sequence.

It is also an objective of the present invention to provide a command buffer that allows either read or write command to be handled to ensure efficient utilization of resource to be taken by the memory controller.

It is yet another objective of the present invention to eliminate redundant accesses by merging multiple write commands going to the same address into one command.

It is a further objective of the present invention to reduce read latency by snarling the read commands from write commands in command buffer if both commands are going to the same address.

It is also an objective of the present invention to improve command bandwidth utilization and improving memory controller efficiency.

Accordingly, these objectives may be achieved by following the teachings of the present invention. The present invention relates to a memory controller system for a storage device comprising a linked-list controller; a plurality of command buffers to store read commands or write commands, wherein each command buffer containing variables set by the linked-list controller; an arbiter to issue command; wherein the linked-list controller is configured to execute commands in sequence independent of logical command buffer sequence; characterized in that each of the command buffer is configured to support read commands with maximum number of write commands; wherein the linked-list controller is configured to merge multiple write commands that are going to the same address; wherein the linked-list controller snarls read commands from write commands if both commands are going to the same address and the read commands that are snarfed are loaded into a separate command buffer; wherein the variables contained in each of the command buffer indicates status and dependency of the command buffer to create a link forming a command sequence.

The present invention also relates to a method of pre-scheduling memory transaction for a storage device, comprising the steps of setting variables of a command buffer comprising read commands and write commands by a linked-list controller; creating a link based on the variables of a plurality of command buffers to form a command sequence; placing an independent command at the head in the link followed by forthcoming command based on tail of the former command buffer; transacting the command according to the link; and loading a new command into an empty command buffer to continue the memory transaction.

The foregoing and other objects, features, aspects and advantages of the present invention will become better understood from a careful reading of a detailed description provided herein below with appropriate reference to the accompanying drawings.

BRIEF DESCRIPTION OF THE DRAWING

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiment of this invention and is therefore not to be considered limiting of its scope, for the invention may admit to other equally effective embodiments.

These and other features, benefits, and advantages of the present invention will become apparent by reference to the following text figure, with like reference numbers referring to like structures across the view, wherein:

FIG. 2A shows an example of linked-list command buffer when the command buffers are empty.

DETAILED DESCRIPTION OF THE INVENTION

Figure 1:
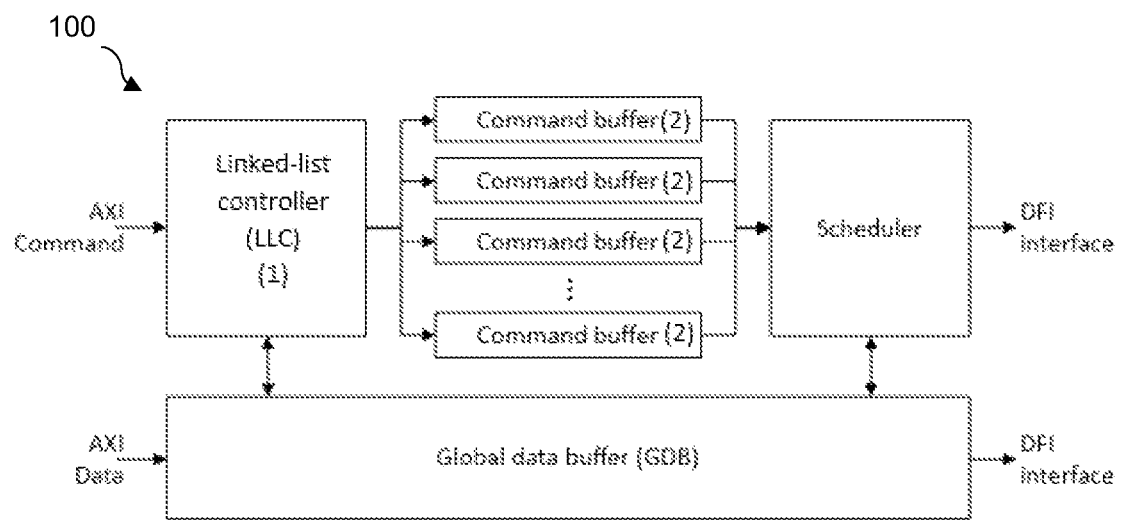
FIG. 1 shows a block diagram of a memory controller system for a storage device according to an embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings as shown in FIGS. 1 to 6, the invention will now be described in more details.

Referring to FIG. 1, the present invention relates to a memory controller system (100) for a storage device comprising a linked-list controller (1); a plurality of command buffers (2) to store read commands or write commands and alongside it contains ordering information, each command buffer (2) containing variables set by the linked-list controller (1); an arbiter to issue command; wherein the linked-list controller (1) is configured to execute commands in sequence independent of logical command buffer sequence; characterized in that each of the command buffer (2) is configured to support read commands with maximum number of write commands; wherein the linked-list controller (1) is configured to merge multiple write commands that are going to the same address; wherein the linked-list controller (1) snarfs read commands from write commands if both commands are going to the same address and the read commands that are snarled are loaded into a separate command buffer (2); wherein the variables contained in each of the command buffer (2) indicates status and dependency of the command buffer (2). The list of data stored in a command buffer (2) are shown in Table 1 under the example.

Figure 2B:
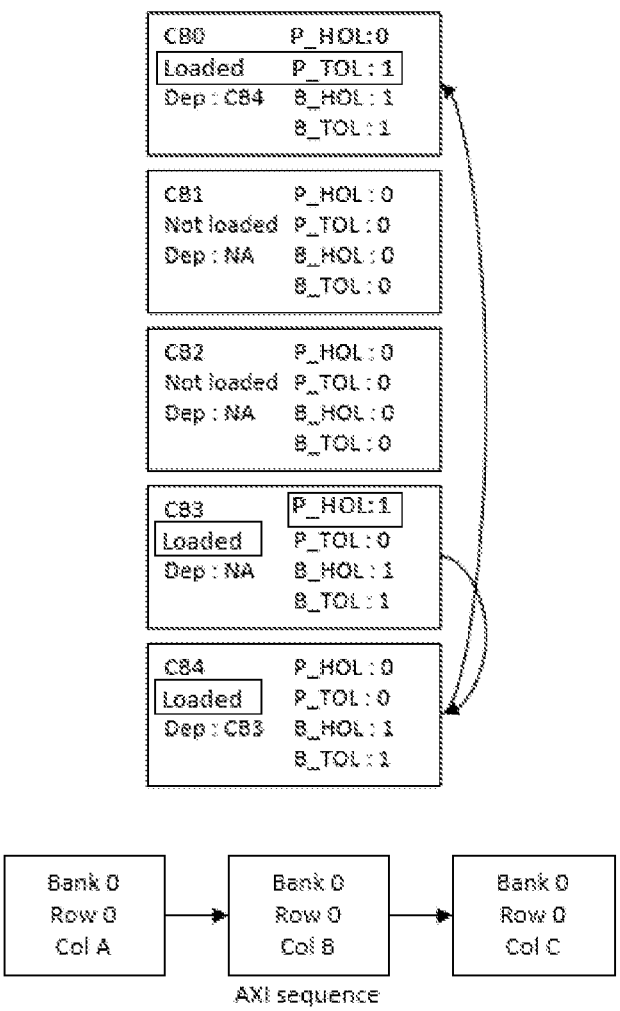
FIG. 2B shows an example of linked-list command buffer when one linked-list is present and occupying three of five command buffers.
Figure 2C:
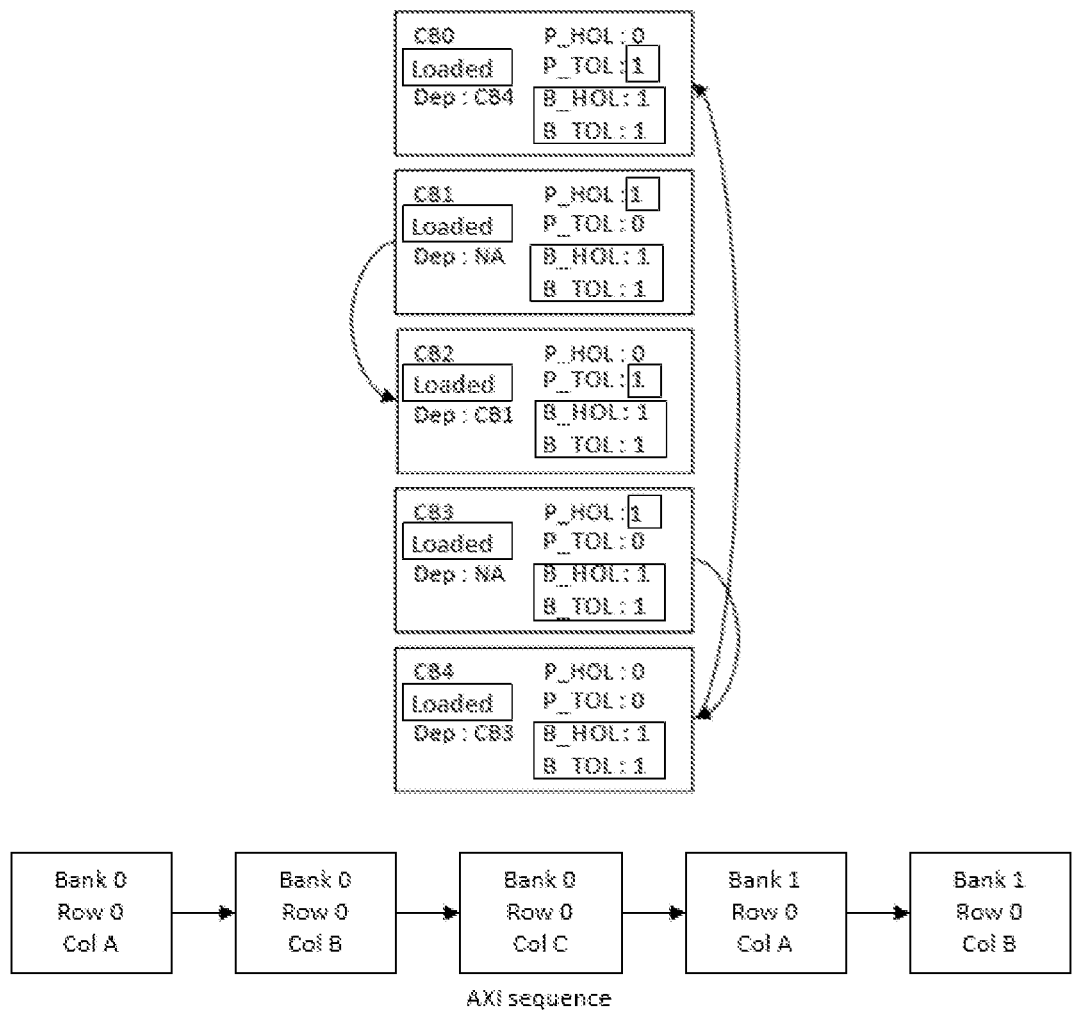
FIG. 2C shows an example of linked-list command buffer when two linked-lists are present in the command buffers.

In accordance with an embodiment of the present invention, the quantity of the plurality of command buffers (2) is configurable for multiple entries with different implementations. Each command buffer (2) containing variables set by the linked-list controller (1) and the variables contained in the command buffer (2) indicates status and dependency of the command buffer (2) to create a link forming a command sequence. The examples of five command buffers (2) with a few variables indicating its status and dependency are shown in FIG. 2A to C. The variables comprise head and tail representing order of the command buffer (2) in the link. An independent command buffer (2) is placed at the head in the link as first command and an incoming command is dependent on tail of the independent command buffer (2) and so on and so forth for the subsequent command order (2).

In accordance with an embodiment of the present invention, the dependency ensure commands are issued on the memory interface according to the set sequence. The dependency could be set based on the desired ordering rules such as accesses to the same address must be in sequence and accesses to different banks can be in parallel. More preferably, the write and read accesses to the same address must be in sequence.

Figure 3:
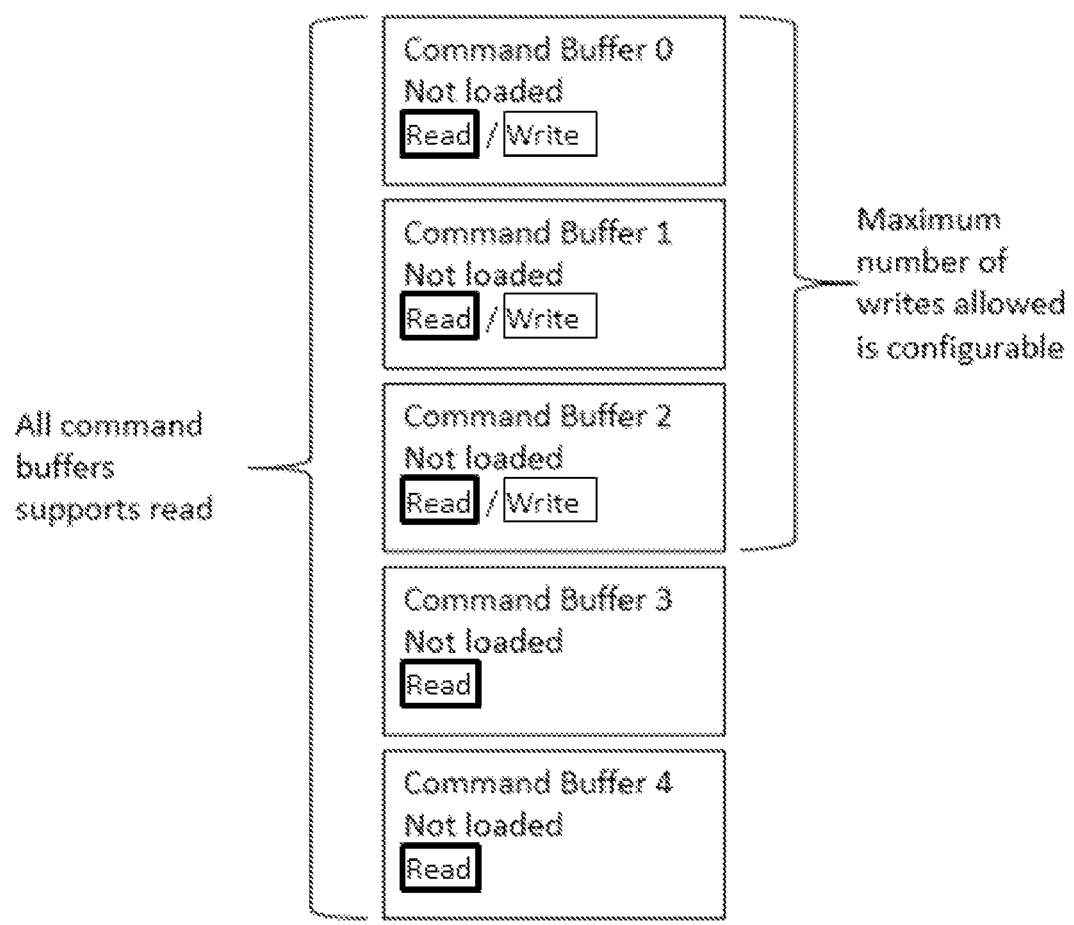
FIG. 3 shows a diagram of the command buffer that supports both read and write commands according to an embodiment of the present invention.

In accordance with an embodiment of the present invention, the arbiter determines maximum number of the write or read commands. Referring to FIG. 3, all command buffers (2) are allowed to handle reads while only three are reserved for writes. Furthermore, a command buffer (2) may need to be reserved for write command only in order to prevent a lock up scenario where command buffers (2) are fully occupied with reads and no writes can be loaded.

The present invention also relates to a method of pre-scheduling memory transaction for a storage device, comprising the steps of setting variables of a command buffer (2) comprising read commands and write commands by a linked-list controller (1); creating a link based on the variables of a plurality of command buffers (2) to form a command sequence; placing an independent command at the head in the link followed by forthcoming command based on tail of the former command buffer (2); transacting the command according to the link; and loading a new command into an empty command buffer (2) to continue the memory transaction.

In accordance with an embodiment of the present invention, the command is transacted by arbiter according to the link when head of the list of both page and bank is set to 1. The arbiter chooses the best command to be issued based on the arbitration policy used when there are more than one commands going to a different bank available. The arbitration policies include but not limited to round-robin, weighted round-robin and first available.

Figure 4:
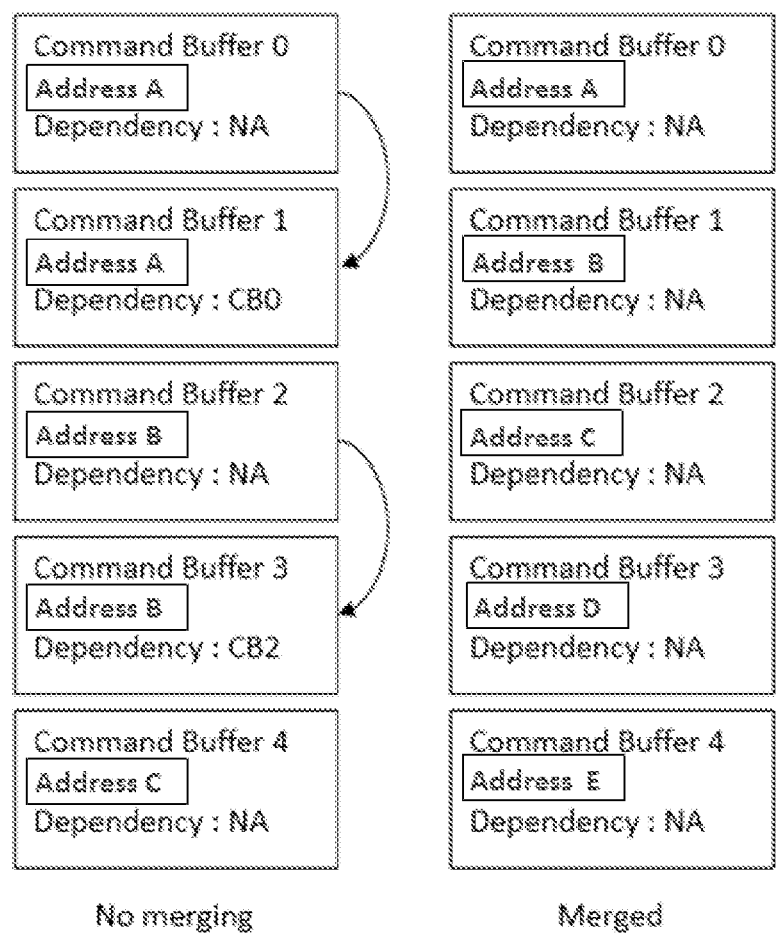
FIG. 4 shows an example of write merging by linked-list controller to merge multiple write commands that are going to the same address according to an embodiment of the present invention.

Referring to FIG. 4, the linked-list controller (1) merges multiple write commands that are going to the same address before transacting the command. The steps of write merging comprises indicating the identity (ID) of the command being merged and ID of the command being merged into to a write data buffer; merging the write commands going to the same address into one command buffer (2); replacing the old data with the new data or combining the data by write data buffer if all bytes are not enabled; loading the commands of different address into another command buffer (2); repeating the preceding steps of merging the write commands and loading new command until the command buffer (2) are fully occupied.

Figure 5:
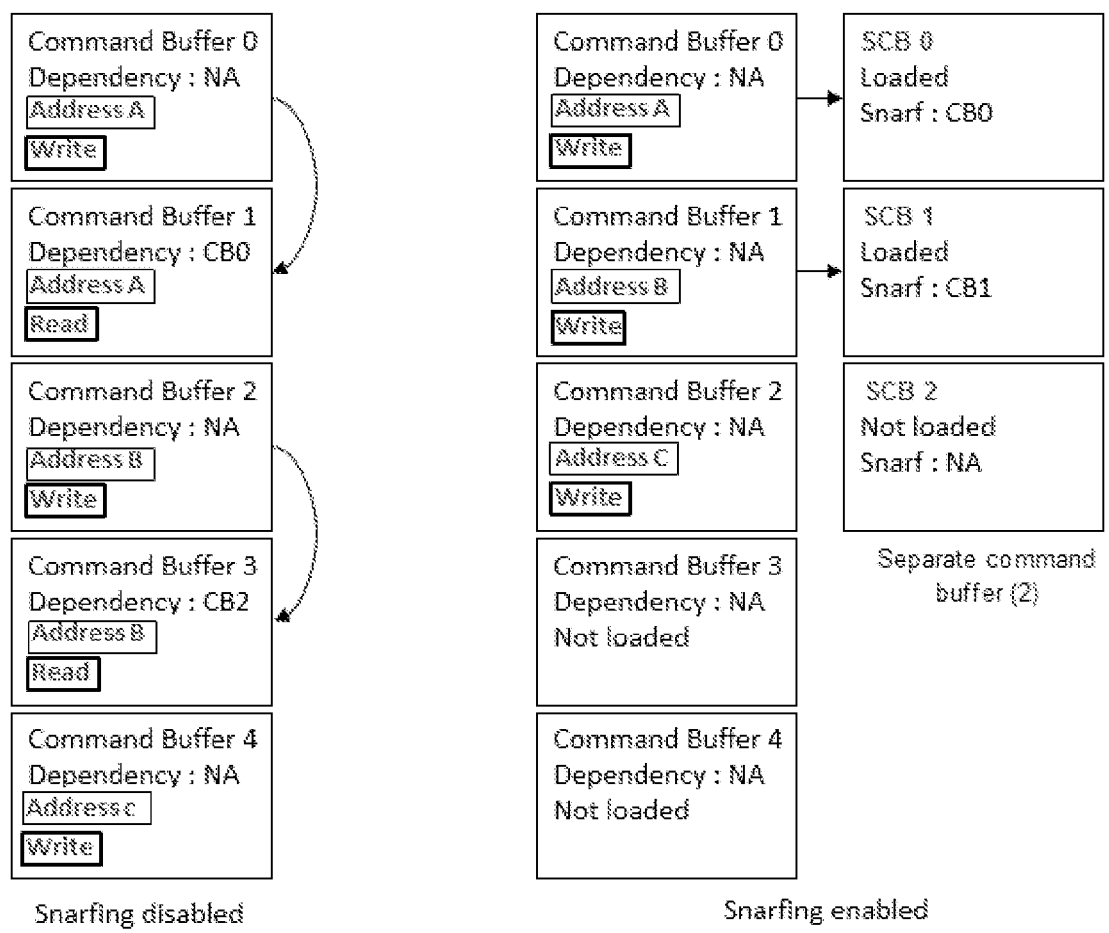
FIG. 5 shows an example of read snarfing by linked-list controller from write commands if the read commands are going to the same address of write commands according to an embodiment of the present invention.

Referring to FIG. 5, the method of pre-scheduling memory transaction for a storage device further comprising the step of snarfing the read commands from write commands if both commands are going to the same address and loading the read commands into a separate command buffer (2). The data from write data buffer is sent back to the user without performing read from the memory device.

In accordance with an embodiment of the present invention, the write commands and read commands of the same address are transacted in sequence, and the write commands and read commands of different banks are transacted in any order or in parallel.

Figure 6:
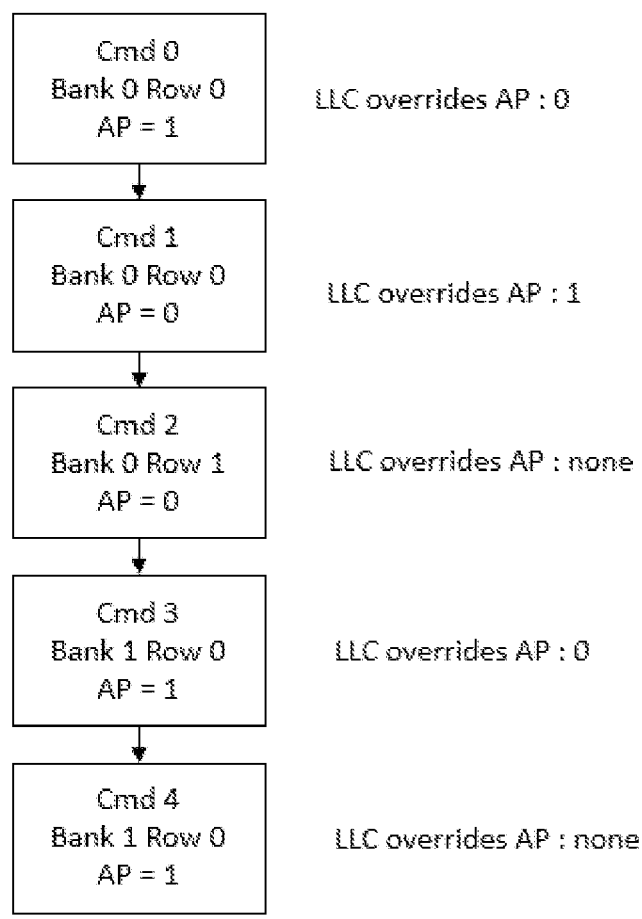
FIG. 6 shows an example of autoprecharge (AP) override by linked-list controller according to an embodiment of the present invention.

Referring to FIG. 6, the linked-list controller (1) can override autoprecharge (AP) command that is asserted when the linked-list controller (1) has future command being linked with the current command. The AP override by linked-list controller (1) and command buffer (2) is based on row access continuity. The linked-list controller (1) set AP low for a continuous row access and set AP high for a row switch, the user AP instruction would be preserved when row continuity information is absent.

Hereinafter, examples of the present invention will be provided for more detailed explanation. It will be understood that the examples described below are not intended to limit the scope of the present invention.

Example

TABLE 1

List of data stored in a command buffer (2)

| Name | Description |
| --- | --- |
| Valid | Indicates whether a command buffer contains valid command |
| Read | High when the command is a read, low for write |
| Address | Read/Write address, broken down to its components ie bank, row, col |
| Page HOL | Head of list indicator for a page (row) |
| Page TOL | Tail of list indicator for a page (row) |
| Bank HOL | Head of list indicator for bank |
| Bank TOL | Tail of list indicator for bank |
| Dependency | Stores the command buffer ID of the prior command in the list forming the link |
| RMW | Set to high when a write command is partial and a read-modify-write operation is required |
| Autoprecharge | Bit is set by the user or generated by internal logic |
| Priority | High priority command cannot be overtaken by newer commands going to into the command buffers |
| Age | Relative age of a command versus others in the command buffers. Command can be elevated to high priority above a certain age. |
| Data received | Set when data for write is received by the memory controller |

Linked-List Head and Tail

The linked-list managed command buffer (2) consists of a few command buffers (2) which quantity is configurable through a parameter. FIG. 2 (a) shows an example when the command buffers (2) are empty or the setting of the variables upon reset of the command buffers (2). New command can be loaded into any of the empty command buffer (2). FIG. 2 (b) shows an example when one linked-list is present and occupying three out of five command buffers (2). The independent command buffer (2) without dependency would be placed at the head in the link (P_HOL=1) and would be issued first on the memory interface. The P_TOL indicates the tail of the list and is used by incoming command to set its dependency on and the commands are transacting according to the link. All commands are going to the same row in the same bank so both B_HOL and B_TOL are set which indicate the first and last bank list present.

FIG. 2 (c) shows an example when two linked-list are present in the command buffers (2). There are two more commands going to a different bank as compared to the example in FIG. 2 (b). Command buffer (2) is allowed to request to the arbiter when both P_HOL and B_HOL is 1. There are two valid commands available to be issued in this example, the arbiter would then choose the best command to be issued based on the arbitration policies implemented. After that, granted command would be removed from the command buffer (2) and the next command in line would now be at the head of the linked-list.

Autoprecharge (AP) Override

The linked-list controller (1) can override AP command issued from the user when the linked-list controller (1) has enough information that indicate whether the AP can be overriden. For example, if the command has its AP indication asserted but the linked-list controller (1) notice that there is a future page hit which also known as same row access command being linked after this command with the AP asserted and the policy is to allow the override, the linked-list controller (1) can choose to override it to clear the AP for allowing a page hit of the subsequent command being linked. If the policy is set to not allow the override, the linked-list controller (1) will honor the AP.

The system and method of the present invention reduces the latency problems significantly and enhances memory scheduling performance by pre-scheduling the commands that will maximize accesses to a page in a DRAM bank, thus capable of supporting multiple DRAM protocols.

The exemplary implementation described above is illustrated with specific characteristics, but the scope of the invention includes various other characteristics.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

It is to be understood that any prior art publication referred to herein does not constitute an admission that the publication forms part of the common general knowledge in the art.

The invention claimed is:

1. A memory controller system for a storage device comprising:
   a linked-list controller;
   a plurality of command buffers to store read commands or write commands, wherein each command buffer containing variables set by the linked-list controller;
   an arbiter configured to issue a command;
   wherein the linked-list controller is configured to execute commands in sequence independent of logical command buffer sequence;
   wherein
   said each command buffer is configured to support said read commands with a maximum number of said write commands;
   wherein the linked-list controller is configured to merge multiple write commands that are going to the same address;
   wherein the linked-list controller snarfs said read commands from said write commands if both commands are going to the same address and the read commands that are snarfed are loaded into a separate command buffer;
   wherein the variables contained in said each command buffer indicates status and dependency of the command buffer to create a link forming a command sequence, and
   wherein the quantity of the plurality of command buffers is configurable for multiple entries with different implementations.

2. The system as claimed in claim 1, wherein the variables comprise head and tail representing order of the command buffer in the link.

3. The system as claimed in claim 2, wherein an independent command buffer is placed at the head in the link as first command and a forthcoming command is dependent on tail of the independent command buffer.

4. The system as claimed in claim 2, wherein the commands of the system access to the same address in sequence and access to different banks in parallel.

5. The system as claimed in claim 1, wherein the arbiter determines maximum number of the write or read commands.

6. A method of scheduling memory transaction, in advance, for a storage device, said method comprising the steps of:
   setting variables of a command buffer comprising read commands and write commands by a linked-list controller;
   creating a link based on the variables of a plurality of command buffers to form a command sequence;
   placing an independent command at a head in the link followed by forthcoming command based on tail of the former command buffer;
   transacting the command according to the link; and
   loading a new command into an empty command buffer to continue the memory transaction,
   wherein transacting the command according to the link by arbiter when head of the list of both page and bank is set to 1.

7. The method as claimed in claim 6, wherein the arbiter issues the command based on the arbitration policies implemented when there are more than one commands going to a different bank available.

8. The method as claimed in claim 6, wherein the method further comprising the step of snarfing the read commands from write commands if both commands are going to the same address and loading the reads command into a separate command buffer.

9. The method as claimed in claim 6, wherein the method further comprising the step of transacting the write commands and read commands of the same address in sequence, and transacting the write commands and read commands of different banks in any order or in parallel.

10. The method as claimed in claim 6, wherein the method further comprising override autoprecharge command asserted when the linked-list controller has future command being linked with the current command.

11. The method as claimed in claim 10, wherein the linked-list controller set autoprecharge low for a continuous row access.

12. The method as claimed in claim 10, wherein the linked-list controller set autoprecharge high for a row switch.

13. The method as claimed in claim 10, wherein the linked-list controller preserves the autoprecharge instruction when row continuity information is absent.

14. A method of scheduling memory transaction, in advance, for a storage device, said method comprising the steps of:
   selling variables of a command buffer comprising read commands and write commands by a linked-list controller;
   creating a link based on the variables of a plurality of command buffers to form a command sequence;
   placing an independent command at a head in the link followed by forthcoming command based on tail of the former command buffer;
   transacting the command according to the link;
   loading a new command into an empty command buffer to continue the memory transaction, and
   merging multiple write commands that are going to the same address by the linked-list controller before transacting the command.

15. The method as claimed in claim 14, wherein the steps of write merging comprising:

indicating the identity of the command being merged and identity of the command being merged into to a write data buffer;

merging the write commands going to the same address into one command buffer;

replacing the old data with the new data or combining the data by write data buffer if all bytes are not enabled;

loading the commands that going other address into another command buffer; and repeating the preceding steps of merging the write commands and loading new command until the command buffer are fully occupied.

\* \* \* \* \*